United States Patent Office 3,463,363
Patented Aug. 26, 1969

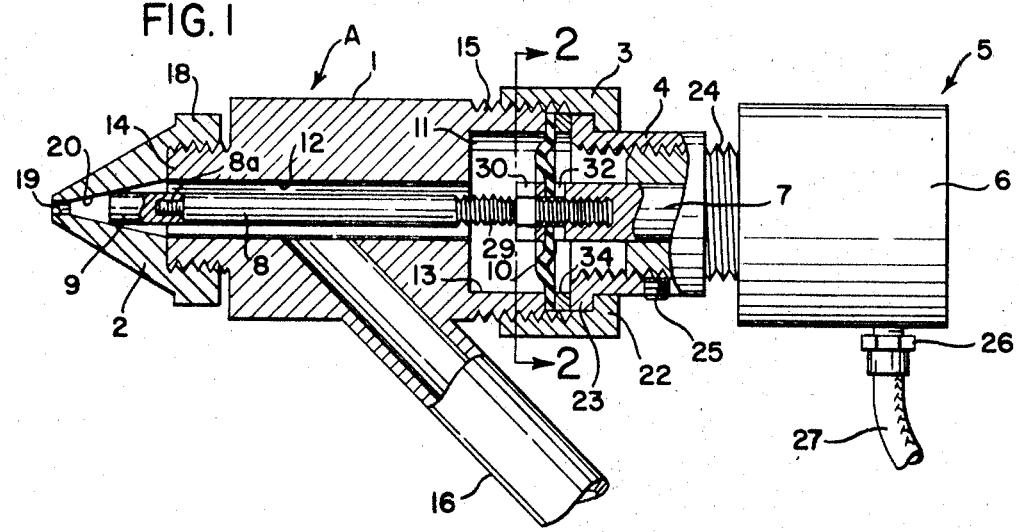

3,463,363
APPLICATOR GUN
Robert P. Zelna, Willoughby, Ohio, assignor to Fusion Incorporated, a corporation of Ohio
Filed Oct. 12, 1967, Ser. No. 674,861
Int. Cl. G01f 11/06, 11/30, 11/36
U.S. Cl. 222—334   1 Claim

ABSTRACT OF THE DISCLOSURE

An applicator gun for solder paste having a pressure-operated plunger (8) mounted to reciprocate in a bore (12) of a main body (1) and a special diaphragm (10) with a central portion clamped to the piston (7) and an outer marginal portion clamped against the main body (1) by a slip ring (34) and by the flanges (22 and 23) of a cylinder support (4) and a locking ring (3). The main wall of the diaphragm (10) may be generally conical in the unstressed condition and is deformed in the assembly to provide a large axially projecting bulge (35) so that the diaphragm has an extremely long life.

---

The present invention relates to pressure-type applicators for fluent solid or paste-type materials such as solders and brazes and more particularly to an applicator gun for solder pastes which may be operated for long periods of time without replacing the seals or packages for the needle valve.

Applicators for industrial pastes, such as solders, have been used for many years for production line soldering and the like. Applicators of this type, as disclosed for example in U.S. Patent No. 3,022,955, were commonly used with a large variety of solder pastes. It was found that such applicators tended to jam after extended use when used with soft solder alloy pastes, such as tin-lead alloy pastes, and were subject to excessive wear when used with silver solder pastes. To avoid such jamming or excessive wear it was necessary to disassemble the applicator regularly and clean or replace the seals or packing used around the reciprocating needle valve or plunger.

The present invention makes it possible to operate the solder gun or applicator continuously for more than a year and perhaps 50 times as long as previously possible without disassembling the entire gun. The applicator of this invention is provided with an flexible diaphragm which permits reciprocation of the needle valve or plunger while preventing leakage of solder paste around the valve. Such diaphragm is so supported as to flex without substantial stretching to minimize stress and minimize deterioration of the rubber so that it can be operated for millions of cycles without being replaced.

An object of the present invention is to provide a simple inexpensive reliable applicator gun for solder paste.

Another object of the invention is to provide an applicator for solder paste which can be operated for an indefinite period of time without replacing the seal for the needle valve or plunger.

Another object of the invention is to provide a simple inexpensive applicator which has a long useful life and is not subject to excessive wear when used with silver solder paste or the like.

A still further object of the invention is to provide an applicator which does not jam up when used with soft solder pastes or the like.

These and other objects, uses and advantages of the invention will become apparent from the following description and claim and from the drawing in which:

FIGURE 1 is a vertical sectional view showing an applicator gun constructed according to the present invention, the parts being shown in their positions when the flow of paste is cut off;

FIGURE 2 is a transverse sectional view taken on the line 2—2 of FIGURE 1;

FIGURE 3 is a fragmentary sectional view similar to FIGURE 1 showing the position of the parts when the valve is open to permit flow of paste;

FIGURE 4 is a fragmentary sectional view of the gun on a larger scale showing parts in the vicinity of the diaphragm in their positions shown in FIGURE 1; and FIGURE 5 is a perspective view showing the needle valve and diaphragm and related parts prior to assembly.

Referring more particularly to the drawing, which are drawn substantially to scale and in which like parts are identified by the same numerals throughout the several views, there is illustrated one form of applicator gun A constructed according to this invention having a main body 1, a nozzle 2, a locking ring 3 and a cylinder support 4 connected to a spring-loaded fluid motor 5.

Such motor may be operated by hydraulic fluid or a gas under pressure and is preferably a reciprocating piston pneumatic motor having a cylinder 6 and a reciprocating piston rod 7 coaxial therewith. Such rod is rigidly connected to a long plunger or needle valve 8 having a removable cylinderical valve tip 9 for engaging the nozzle. Said tip has an internally threaded bore to screw onto the threaded end portion 8a of the valve 8.

The gun has a circular diaphragm 10 formed as a flat sheet or disc of uniform thickness using an elastomeric material, such as rubber or plastic, which is capable of flexing or stretching to permit reciprocation of the needle valve 8. The diaphragm is located at the end of a circular chamber 11 formed at the end of the cylindrical bore 12 of the main body by a counterbore 13.

The main body has a front annular threaded portion 14 of reduced diameter and an annular threaded portion 15 surrounding the chamber 11. The body also has an inclined extension providing a conduit 16 having a bore 17 therethrough for conveying solder paste to the nozzle. The nozzle has an annular threaded portion 18 screwed on to the body portion 14 and has a bore 19 providing a discharge opening coaxial with the bore 12 and the valve 8. The nozzle has a smooth frusto-conical surface 20 as disclosed in said Patent No. 3,022,955 for engaging said valve tip 9.

The locking ring 3 has an annular inturned flange 22 which engages the radially extending flange 23 of the cylinder support 4 to clamp said support rigidly in position on the body 1. The cylinder 6 has an annular externally threaded portion 24 which screws into the internally threaded support 4 and is rigidly fixed in position by a set screw 25. Thus, the fluid motor 5 is rigidly mounted in a fixed position on the rear end of the gun A. Such motor has suitable inlet and outlet connections to effect operation of the motor and reciprocation of the piston rod 7. As herein shown, an inlet connection 25 is provided for receiving an air supply line 27 from a suitable source of air under pressure.

The needle valve 8 has a long threaded end portion 29 which is screwed into the internally threaded end portion of the piston rod 7. A positioning nut 30 and a pair of forming washers 31 and 32 fit on the portion 29 to clamp the diaphragm 10 in position on the needle valve, the diaphragm having a small circular hole 33 of size to fit over the portion 29.

The diaphragm 10 may be formed of any flexible material, such as rubber, metal, plastic or leather sheet. As illustrated, the diaphragm is made from a rubber which has good oil resistance and good acid resistance. The diaphragm may be made of nitrile rubber, neoprene rubber or various other commercial elastic rubbers. Buna N rubbers, for example, are excellent for this purpose.

The valve tip 9 is preferably formed of a rubber or plastic material which can deform slightly. Such tip may, for example, be formed of a plastic, such as Teflon or nylon, or a rubber, such as nitrile rubber, neoprene rubber or the like. Because the tips 9 are regularly replaced and need not have a long life, they may be formed of a wide variety of materials.

When the applicator gun A is assembled, the positioning nut 30 is tightened to squeeze the diaphragm between the two forming washers 31 and 32 and force the washer 32 against the end of the piston rod 7 as shown in FIGURE 4. This compresses the rubber at the margin of the hole 33 and causes the remainder of the diaphragm to assume a generally conical shape with the point of the cone extending toward the cylinder 6. The slip ring 34 is then slid over the diaphragm to a position between the diaphragm and the flange 23 of the cylinder support 4, and the cone formed by the diaphragm is reversed by pulling the outer edges of the diaphragm toward the slip ring 34, whereby the slip ring is held by the diaphragm against the flange 23. After the position of the tip 9 has been properly adjusted relative to the piston rod 7, the locking ring 3 is screwed onto the body 1 to clamp the flange 23 against the slip ring 34 and to compress the outer marginal portion of the diaphragm 10 between the ring and the end of the body 1 as shown in FIGURE 4. The set screw 25 is then tightened to complete the assembly. The gun is then ready to apply a solder paste.

The solder paste is supplied to the gun in any suitable manner as described, for example, in Patent No. 3,022,955. The pressure applied to the paste may be just sufficient to maintain a supply of paste in the bore 8. The pressure for forcing the paste out of the nozzle 2 is provided by the piston of the motor 5, the plunger 8 acting as a pump piston as described in the above patent. The air pressure employed in the supply line 27 may vary considerably depending on the type of paste being used but is usually in the range of 4 to 30 pounds per square inch. The pressure is applied to one face only of the piston, and a spring returns the piston to its original position. However, a double-acting piston may be used, if desired.

As will be apparent from the drawing, the diaphragm has a bulge 35 permitting movement of the diaphragm from the position shown in FIGURE 1 to the position shown in FIGURE 3 by flexing without stretching the rubber. This permits the reciprocation of the plunger 8 through the full stroke needed for operation of the gun and provides the diaphragm with maximum life. The diaphragm can be sufficiently large to provide a larger bulge or several bulges thereby reducing the flexural stress at any point. On the other hand, the diaphragm can, if desired, be designed to be subjected primarily to tension or compression stress rather than flexural stress.

It will be understood that the above description is for purposes of illustration rather than limitation and that in accordance with the provisions of the patent law, variations and modifications of the specific devices disclosed herein may be made without departing from the spirit of the invention.

What is claimed is:

1. In a pressure-type applicator gun for solder paste having a main body (1) with a nozzle (2) at the front end having a central discharge opening (19) and a conical internal surface (20) providing a valve seat and with a central bore (12) aligned with said discharge opening, a plunger (8) located in said bore and extending through said main body into said nozzle, a removable valve tip (9) for engaging the conical surface of said valve seat, said valve tip being formed of a flexible polymeric material, a pneumatic cylinder (6) at the rear of said main body having a reciprocating piston (7) extending from said cylinder and connected to said plunger to effect reciprocation thereof to eject the solder paste in increments from said nozzle, and conduit means (16) for feeding the solder paste to said bore, the improvement which comprises diaphragm means for sealing the rear of said bore, said diaphragm means comprising a flexible diaphragm (10) having a central hole (33) to receive said plunger and an outer marginal portion (10b) engaging the radially outer portions of said main body, means (29, 30, 31, 32) connecting said plunger to said piston and clamping said diaphragm against said piston at the margin of said central hole, and means (3, 4, 34) clamping the outer marginal portion of said diaphragm against the radially outer portions (15) of said main body, said diaphragm having an annular axially projecting portion (35) and being shaped to permit such reciprocation of the plunger without applying substantial tensile force to the diaphragm wherein said diaphragm (10) is generally conical in the normal unstressed condition and forms an annular axially projecting bulge (35) in the assembly, wherein the first-named clamping means compresses the rubber at the margin of said central circular hole and the second-named clamping means clamps the outer marginal portion of the diaphragm against the rear end of said main body (1) to cause formation of said bulge (35), whereby reciprocation of the piston (7) does not subject the diaphragm to substantial tension, and wherein the last-named clamping means comprises an annular cylinder support (4) mounted coaxial with said piston and having an outwardly extending flange (23) and a locking ring (3) screwed into said main body and having a radially inwardly projecting flange (22) engaging said last-named flange (23).

References Cited

UNITED STATES PATENTS

| 2,186,214 | 1/1940 | Simon | 239—412 X |
|---|---|---|---|
| 2,311,018 | 2/1943 | Bahnson | 239—412 X |
| 2,825,602 | 3/1958 | Rabbitt | 239—412 X |
| 3,022,955 | 2/1962 | Riddell | 239—456 |
| 3,034,761 | 5/1962 | Janquart. | |
| 3,162,336 | 12/1964 | Erickson | 222—504 X |
| 3,231,144 | 1/1966 | Rouanet et al. | 222—504 X |
| 3,355,112 | 11/1967 | Shaffer et al. | 222—504 X |

WALTER SOBIN, Primary Examiner

U.S. Cl. X.R.
222—504; 239—412